United States Patent
Manning et al.

(10) Patent No.: US 11,422,826 B2
(45) Date of Patent: Aug. 23, 2022

(54) OPERATIONAL CODE STORAGE FOR AN ON-DIE MICROPROCESSOR

(71) Applicant: Micron Technology, Inc., Boise, ID (US)

(72) Inventors: Troy A. Manning, Meridian, ID (US); Jonathan D. Harms, Meridian, ID (US); Troy D. Larsen, Meridian, ID (US); Glen E. Hush, Boise, ID (US); Timothy P. Finkbeiner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 158 days.

(21) Appl. No.: 16/878,226

(22) Filed: May 19, 2020

(65) Prior Publication Data
US 2021/0365268 A1 Nov. 25, 2021

(51) Int. Cl.
G06F 9/4401 (2018.01)
G06F 9/38 (2018.01)
G06F 12/0868 (2016.01)
G06F 13/16 (2006.01)
G06F 12/1045 (2016.01)

(52) U.S. Cl.
CPC .......... *G06F 9/4403* (2013.01); *G06F 9/3836* (2013.01); *G06F 9/4406* (2013.01); *G06F 12/0868* (2013.01); *G06F 12/1054* (2013.01); *G06F 13/1668* (2013.01); *G06F 2212/7201* (2013.01); *G06F 2212/7211* (2013.01)

(58) Field of Classification Search
CPC .... G06F 9/4403; G06F 9/3836; G06F 9/4406; G06F 12/0868; G06F 12/105; G06F 13/1668
See application file for complete search history.

(56) References Cited

U.S. PATENT DOCUMENTS

| | | | |
|---|---|---|---|
| 2006/0036816 A1* | 2/2006 | McMahan | G06F 12/1458 711/153 |
| 2019/0179740 A1 | 6/2019 | Perego et al. | |
| 2019/0332281 A1 | 10/2019 | Fackenthal et al. | |
| 2019/0333570 A1 | 10/2019 | Kim et al. | |
| 2019/0384512 A1 | 12/2019 | Penney et al. | |
| 2020/0026475 A1 | 1/2020 | Yang | |

OTHER PUBLICATIONS

ISA/KR, International Search Report and Written Opinion of the International Searching Authority, Int'l Appl. No. PCT?US2021/030812, dated Aug. 26, 2021, Korean Intellectual Property Office, Seo-gu, Daejeon, Republic of Korea, 10pgs.

* cited by examiner

*Primary Examiner* — Tammara R Peyton
(74) *Attorney, Agent, or Firm* — Holland & Hart LLP

(57) ABSTRACT

Methods, systems, and devices for operational code storage for an on-die microprocessor are described. A microprocessor may be formed on-die with a memory array. Operating code for the microprocessor may be stored in the memory array, possibly along with other data (e.g., tracking or statistical data) used or generated by the on-die microprocessor. A wear leveling algorithm may result in some number of rows within the memory array not being used to store user data at any given time, and these rows may be used to store the operating code and possibly other data for the on-die microprocessor. The on-die microprocessor may boot and run based on the operating code stored in memory array.

23 Claims, 7 Drawing Sheets

OPERATIONAL CODE STORAGE FOR AN ON-DIE MICROPROCESSOR

BACKGROUND

The following relates generally to one or more memory systems and more specifically to operational code storage for an on-die microprocessor.

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

DETAILED DESCRIPTION

Figure 1:
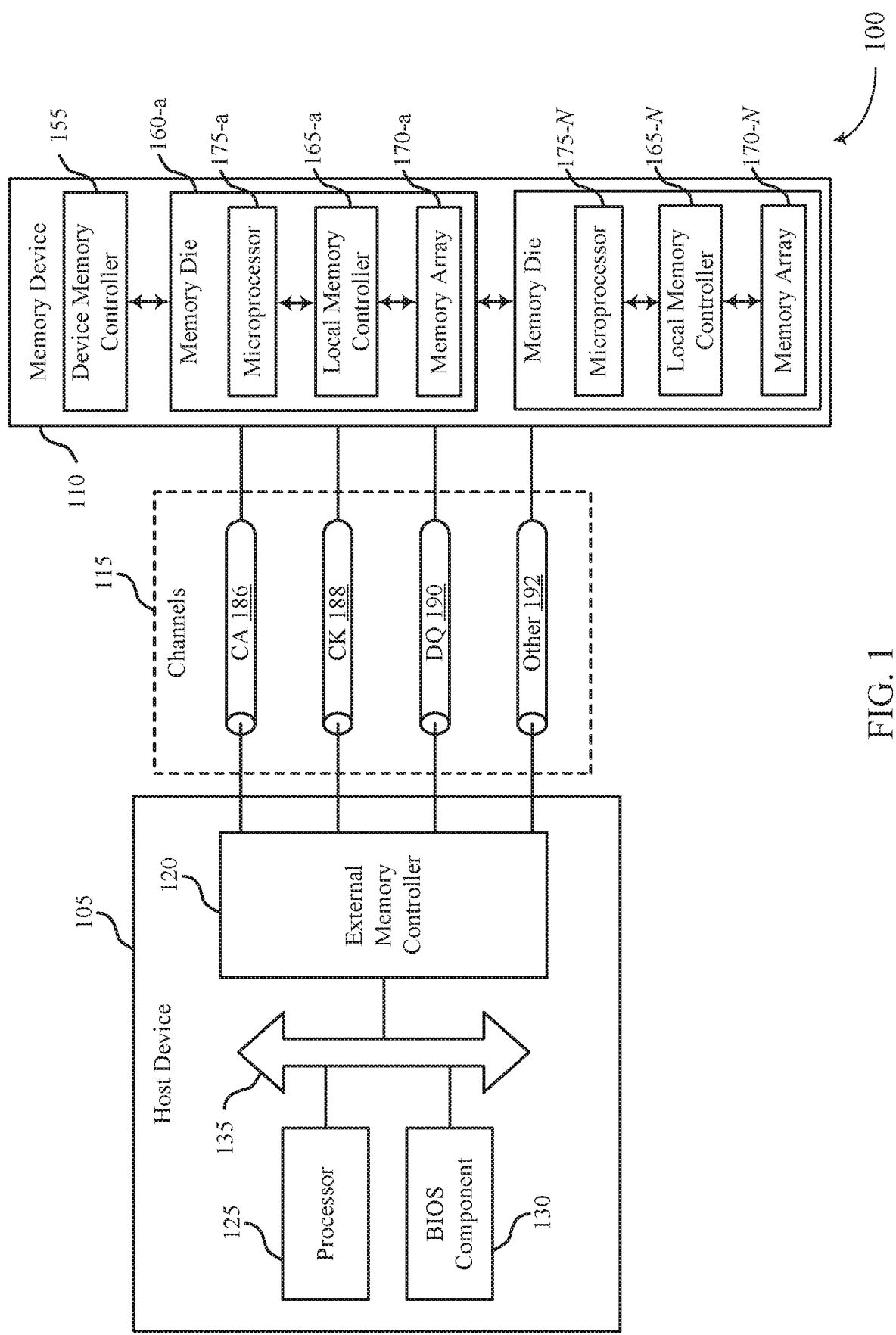
FIG. 1 illustrates an example of a system that supports operational code storage for an on-die microprocessor in accordance with examples as disclosed herein.

In some cases, an on-die system may include a microprocessor. If the on-die system is fully self-contained, the operating code that the microprocessor uses may also be stored on-die.

In some systems, operating code for a microprocessor may be stored in read-only memory (ROM). However, systems that store the operating code in ROM may not have a capability to modify the operating code during run-time, or to use the ROM to store other data generated by or otherwise associated with operating the microprocessor, due to the read-only nature of the ROM.

As described herein, an on-die system may include a non-volatile memory array that supports both read and write operations (e.g., a ferroelectric random access memory (FeRAM) memory array) along with a microprocessor on a same semiconductor die, and operating code for the microprocessor may be stored in the non-volatile memory array. The array may also be used to store user data—which may refer to data written and read by a host device for the on-die system, and which may be exchanged via a data (DQ) bus for the on-die array—and the operating code may be stored within memory cells of the array not being used to store user data. The memory array may provide memory class memory for the host device, for example. Other data associated with the microprocessor (e.g., tracking or statistical data that the microprocessor may generate or otherwise use, such as data that may relate to managing operation of the array) may be stored in similar fashion as the operating code for the microprocessor. Storing the operating code and other data associated with the microprocessor within the same writable array used to store user data may, for example, conserve die space (e.g., by eliminating the need for dedicated ROM for the microprocessor), provide for increased flexibility in use of the microprocessor (e.g., to monitor and manage array performance), among other benefits that may be appreciated by one of ordinary skill in the art.

In some cases, the on-die system may employ a wear leveling procedure (algorithm) for the array, whereby data within the memory array may be relocated or otherwise rotated between different physical addresses within the array so as to even the extent of wear associated with different memory cells within the array. To support the wear leveling procedure, some quantity of rows (or potentially other groupings) of memory cells may not be used to store user data at any given time during the operation of the array. Such rows may be referred to as "gap" or "skip" rows. Operating code (or other data) for the on-die microprocessor may be stored at some quantity of skip rows within the array, and the on-die microprocessor may boot and run using such operating code. Other rows within the array may be used to store user data.

Features of the disclosure are initially described in the context of memory systems and dies as described with reference to FIGS. 1-2. Features of the disclosure are described in the context of a memory die architecture and an instruction storage scheme as described with reference to FIGS. 3-4. These and other features of the disclosure are further illustrated by and described with reference to an apparatus diagram and flowcharts that relate to operational code storage for an on-die microprocessor as described with reference to FIGS. 5-7.

FIG. 1 illustrates an example of a system 100 that supports operational code storage for an on-die microprocessor in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). As described herein, a memory device 110 may include a microprocessor 175 on a same die 160 as a memory array 170.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105—which may be referred to as user data—or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

In some cases, a memory die 160 may include one or more microprocessors 175. For example, a memory die 160 may include one microprocessor 175, one microprocessor 175 per bank of a memory array 170, or some other configuration. Operating code for an on-die microprocessor 175 may be stored on-die. For instance, the operating code may be stored in a memory array 170 of the memory die 160 (e.g., a non-volatile memory array, such as an FeRAM memory array may, as one example).

The microprocessor 175 may boot and run using the code stored in the memory array 170. For example, the boot address and full operating program for the microprocessor 175 may be stored in the memory array 170. In some cases, the operating code that is stored in the memory array 170 for the microprocessor 175 may be or include BIOS code (e.g., firmware) for the microprocessor 175—that is, BIOS code that is separate and apart from any BIOS code for the host device 105, and thus separate and apart from any BIOS code provided by the BIOS component 130. In some cases, additional data associated with the microprocessor 175, such as data related to monitoring and managing the performance and operation of the memory array 170, and which may be inaccessible to the host device 105 (e.g., outside an address space that is addressable by the host device 105 via command and address (CA) channels 186 (which may alternatively be referred to as a CA bus), may also be stored in the memory array 170. In some cases, some or all of the structures or functions ascribed herein to a local memory controller 165, device memory controller 155, or other controller described herein as possibly included in a memory device 110 may instead be included in or performed by the microprocessor 175, and thus a memory device 110 may or may not include any separate controller.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

Figure 2:
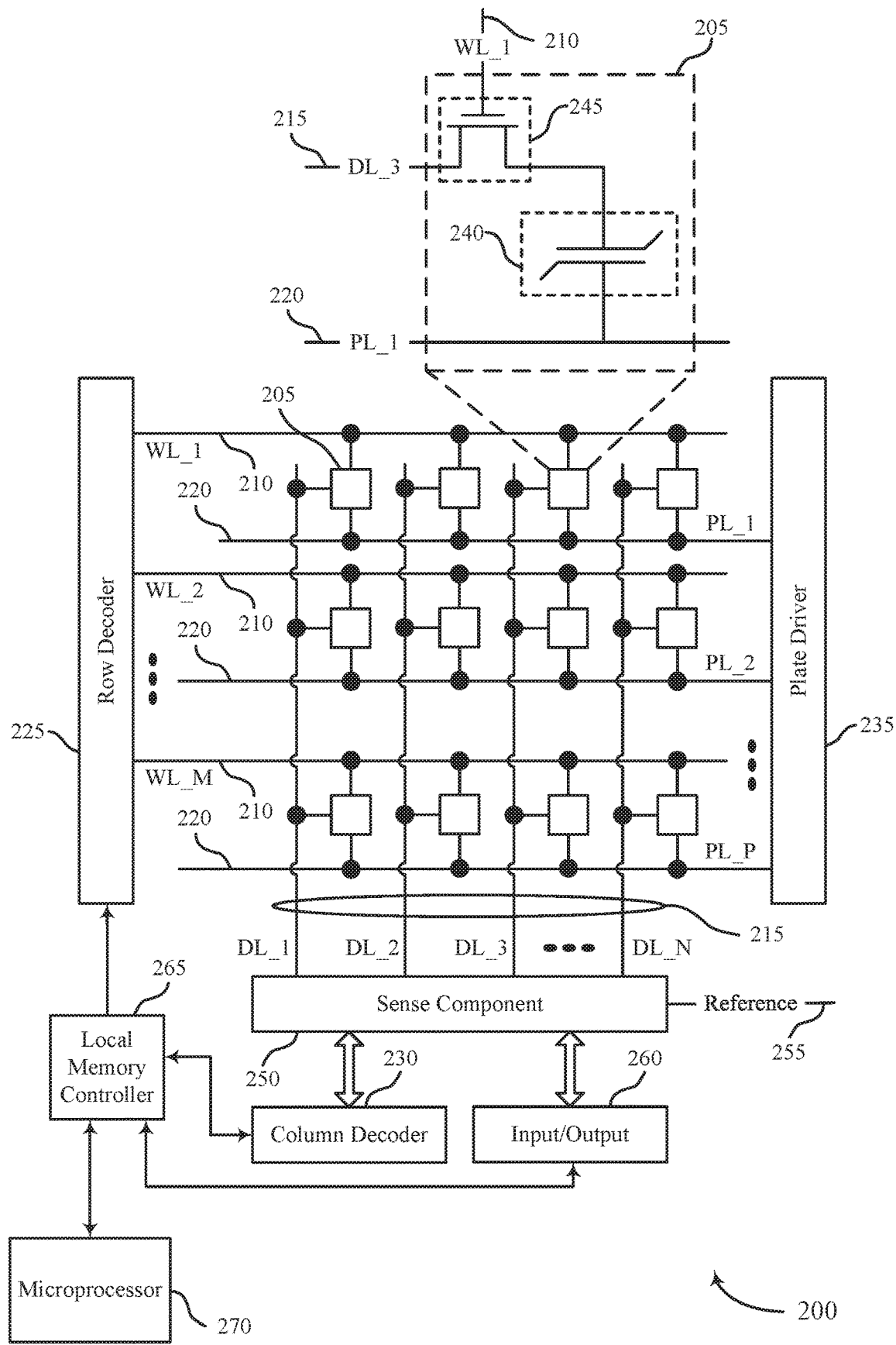
FIG. 2 illustrates an example of a memory die that supports operational code storage for an on-die microprocessor in accordance with examples as disclosed herein.

FIG. 2 illustrates an example of a memory die 200 that supports operational code storage for an on-die microprocessor in accordance with examples as disclosed herein. The memory die 200 may be an example of a memory die 160 as described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1. The memory die 200 may include a microprocessor 270, which may be an example of a microprocessor 175 as described with reference to FIG. 1.

Certain examples described herein are described in the context of an FeRAM memory array, but it is to be understood that the teachings herein may be applied in the context of any kind of memory array, with FeRAM being just one illustrative possibility. Where memory cells 205 are ferroelectric memory cells, a memory cell 205 may store a state (e.g., polarization state or dielectric charge) representative of the programmable states in a capacitor. For example, the memory cell 205 may include a capacitor 240 that includes a ferroelectric material to store a charge and/or a polarization representative of the programmable state. The memory cell 205 may include a logic storage component, such as capacitor 240, and a switching component 245. The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

The memory die 200 may include access lines (e.g., the word lines 210, the digit lines 215, and the plate lines 220)

arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding or operation. Memory cells 205 may be positioned at intersections of the word lines 210, the digit lines 215, and/or the plate lines 220.

Operations such as reading and writing may be performed on memory cells 205 by activating or selecting access lines such as a word line 210, a digit line 215, and/or a plate line 220. By biasing a word line 210, a digit line 215, and a plate line 220 (e.g., applying a voltage to the word line 210, digit line 215, or plate line 220), a single memory cell 205 may be accessed at their intersection. Activating or selecting a word line 210, a digit line 215, or a plate line 220 may include applying a voltage to the respective line.

Accessing the memory cells 205 may be controlled through a row decoder 225, a column decoder 230, and a plate driver 235. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

A word line 210 may be a conductive line in electronic communication with a memory cell 205 that is used to perform access operations on the memory cell 205. In some architectures, the word line 210 may be in electronic communication with a gate of a switching component 245 of a memory cell 205 and may be operable to control the switching component 245 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 250. In some architectures, the memory cell 205 may be selectively coupled with the digit line 215 during portions of an access operation. For example, the word line 210 and the switching component 245 of the memory cell 205 may be operable to selectively couple and/or isolate the capacitor 240 of the memory cell 205 and the digit line 215. In some architectures, the memory cell 205 may be in electronic communication (e.g., constant) with the digit line 215.

A plate line 220 may be a conductive line in electronic communication with a memory cell 205 that is used to perform access operations on the memory cell 205. The plate line 220 may be in electronic communication with a node (e.g., the cell bottom) of the capacitor 240. The plate line 220 may cooperate with the digit line 215 to bias the capacitor 240 during access operation of the memory cell 205.

The sense component 250 may determine a state (e.g., a polarization state or a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage). The detected logic state of the memory cell 205 may be provided as an output of the sense component 250 (e.g., to an input/output 260), and may indicate the detected logic state to another component of a memory device 110 that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 265 may generate row signals and column address signals to activate the target word line 210, the target digit line 215, and the target plate line 220. The local memory controller 265 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

The local memory controller 265 may be operable to perform a write operation (e.g., a programming operation) on one or more memory cells 205 of the memory die 200. During a write operation, a memory cell 205 of the memory die 200 may be programmed to store a desired logic state. The local memory controller 265 may identify a target memory cell 205 on which to perform the write operation. The local memory controller 265 may identify a target word line 210, a target digit line 215, and a target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The local memory controller 265 may apply a specific signal (e.g., write pulse) to the digit line 215 during the write operation to store a specific state (e.g., charge) in the capacitor 240 of the memory cell 205. The pulse used as part of the write operation may include one or more voltage levels over a duration.

The local memory controller 265 may be operable to perform a read operation (e.g., a sense operation) on one or more memory cells 205 of the memory die 200. During a read operation, the logic state stored in a memory cell 205 of the memory die 200 may be determined. The local memory controller 265 may identify a target memory cell 205 on which to perform the read operation. The local memory controller 265 may identify a target word line 210, a target digit line 215, and target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The target memory cell 205 may transfer a signal to the sense component 250 in response to biasing the access lines. The sense component 250 may amplify the signal. The local memory controller 265 may activate the sense component 250 (e.g., latch the sense component) and thereby compare the signal received from the memory cell 205 to the reference 255. Based on that comparison, the sense component 250 may determine a logic state that is stored on the memory cell 205.

Memory die 200 may also include one or more microprocessors 270, which in some cases may be coupled with the local memory controller 265. Additionally or alternatively, the microprocessor may be coupled with any other aspect of the memory dies 200 (e.g., row decoder 225, column decoder 230, plate driver 235, input/output 260). And in some cases, some or all of the structure or functions ascribed herein to local memory controller 265 may instead be included in or performed by microprocessor 270 (e.g., local memory controller 265 may be absent in some implementations).

The microprocessor may, for example, monitor and potentially manage one or more aspects of the performance or operation of the array of memory cells 205, in accordance with the examples described herein. A subset of the memory cells 205 in the array may be used to store operating code or other data (e.g., performance statistics, performance log data, or other data related to the performance or operation of the array) for the microprocessor 270. For instance, the microprocessor 270 may operate to store the operating code and/or other data in one or more rows of memory cells 205 (each row coupled with a respective word line 210). In some cases, the rows of memory cells 205 used to store the operating code and/or other data for the microprocessor 270 may be skip rows and may be available for such use due at least in part to a wear leveling procedure for the array. During operation of the array and the die 200, the wear leveling procedure may (e.g., periodically or on an otherwise scheduled or commanded basis) rotate the storage location of data within the array to equalize (normalize, balance, even, level) the amount of wear associated with different memory cells 205 within the array. Thus, in some cases the physical location at which the operating code and/or other data for the microprocessor 270 may vary (rotate, change) over time as the array is operated, in accordance with the wear leveling procedure.

Figure 3:
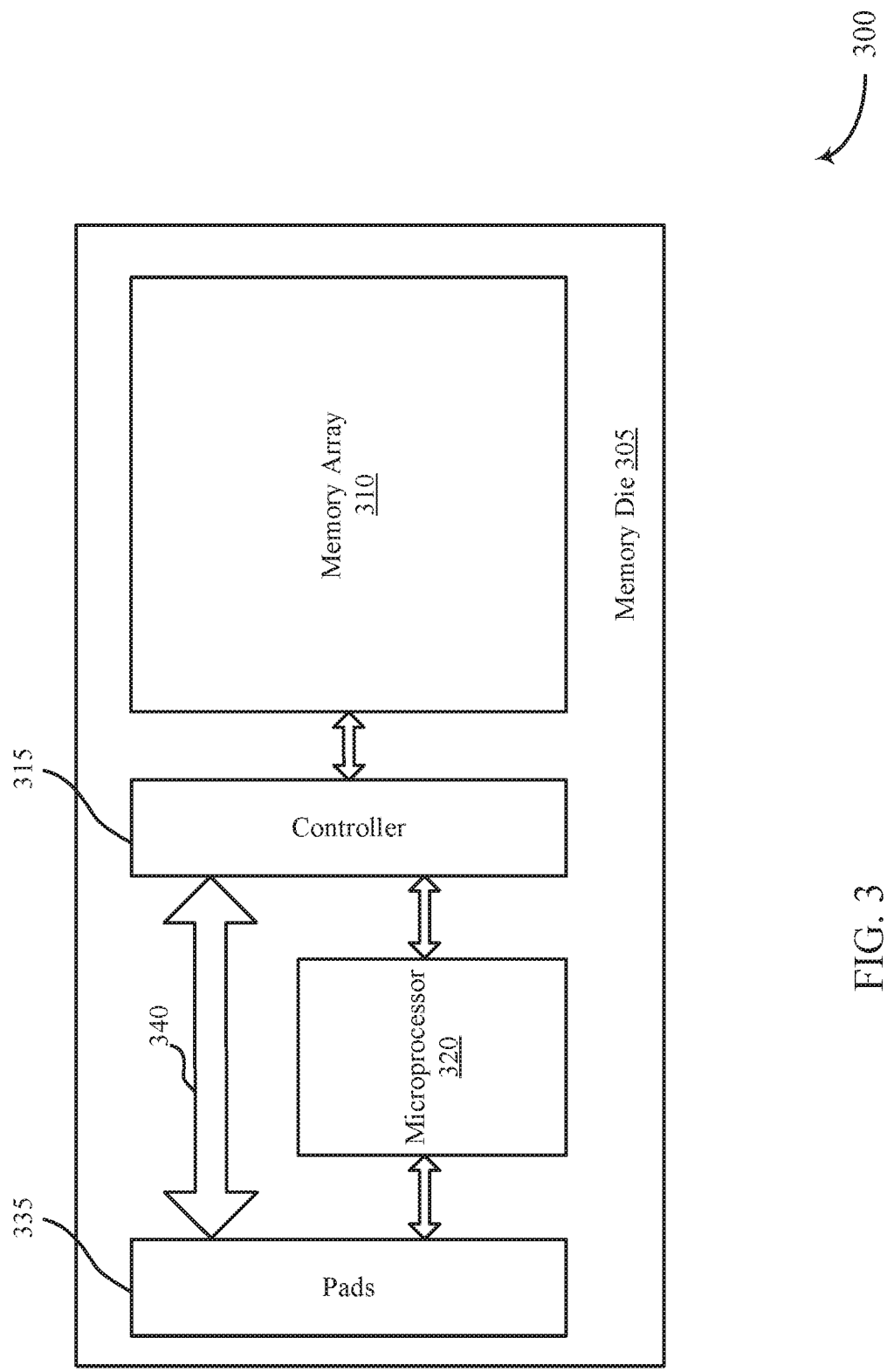
FIG. 3 illustrates an example of a memory die architecture that supports operational code storage for an on-die microprocessor in accordance with examples as disclosed herein.

FIG. 3 illustrates an example of a memory die architecture 300 that supports operational code storage for an on-die microprocessor in accordance with examples as disclosed herein. Memory die architecture 300 may include a memory die 305, which may be an example of aspects of a memory die 160 as described with reference to FIG. 1 or a memory die 200 as described with reference to FIG. 2. In some examples, memory die 305 may be an example of a semiconductor memory die or a silicon memory device.

Memory die 305 may include a memory array 310, which may be an example of aspects of a memory array 170 as described with reference to FIG. 1 or an array as described with reference to FIG. 2. The memory array 310 may be a collection (e.g., one or more grids, one or more banks, one or more tiles, one or more sections) of memory cells, with each memory cell being operable to store at least one bit of data. In cases where the memory array includes one or more banks, each of the one or more banks may include one or more subarrays.

Memory die 305 may also include a controller 315 coupled with the memory array 310. The controller 315 may be an example of aspects of a device memory controller 155 or a local memory controller 165 as described with reference to FIG. 1 or a local memory controller 265 as described with reference to FIG. 2. The controller 315 may be operable to control operation of the memory array 310. For instance, in cases where the memory array 310 includes one or more banks, the controller 315 may be operable to access one of the one or more banks concurrently with accessing another one of the one or more banks. Additionally, when accessing a bank, the controller 315 may access one subarray at a time within the bank. As such, when accessing multiple of the one or more banks concurrently, the controller 315 may be operable to access a first subarray within a first bank, a second subarray within a second bank, and so on. Controller 315 may also include or be coupled with decoding circuitry, such as one or more row decoders 225, column decoders 230, or plate drivers 235 as described with reference to FIG. 2 or a command decoder for decoding commands received from a source external to the memory die 305 (e.g., a host device 105).

The controller 315 may be coupled with a bus 340 via which the controller 315 may receive user data from and transmit user data to a source external to the memory die 305 (e.g., a host device 105). Thus bus 340 may also carry commands (e.g., access commands) and address information associated with the user data. The controller 315 may be operable to store the data received via the bus 340 in a subset of the memory array 310 (e.g., a subset of the memory cells within the memory array 310). The bus 340 may be coupled with one or more pads 335 included in the memory die 305. The pads 335 may be coupled (e.g., via pins, balls, bond pads, bond wires, or any other type of interconnect, or any combination thereof) with any quantity of channels 115 as described with reference to FIG. 1, including DQ channels 190 and CA channels 186, among other examples.

The subset of the memory array 310 for storing user data may be associated with a logical address space, where commands associated with the user data and received over the bus 340 may reference logical addresses within the logical address space to identify or otherwise associate the commands with corresponding user data. For example, a read or write command may include or otherwise be associated with (e.g., received concurrently or with some other defined timing relative to) a logical address, and the controller 315 may identify a location within memory array 310 for reading or writing the user data for the command based on the logical address. Physical storage locations within the memory array 310 (e.g., banks, subarrays, rows, columns, memory cells) may each have a respective physical address within a physical address space, and the controller 315 may maintain and utilize a logical-to-physical address mapping to correlate logical addresses associated with user data and commands with physical addresses within the memory array. In some cases, logical addresses may alternatively be referred to as virtual addresses, and the logical address space may alternatively be referred to as a virtual address space.

In some cases, the physical address space associated with the memory array 310 may be larger than the logical address space associated with commands and user data exchanged over the bus 340 (e.g., the logical address space used by a host device 105). A first subset of physical locations with the memory 310 may have physical addresses for which a corresponding logical address exists within the logical address space, and memory cells within the first subset of physical locations with the memory 310 may be accessible to a device external to the memory die 305 (e.g., to a host device 105) and available to store user data. A second subset of physical locations with the memory 310 may have physical addresses for which no corresponding logical address exists within the logical address space, and this second subset of physical locations with the memory 310 may not be accessible to a device external to the memory die 305 (e.g., to a host device 105) or available to store user data.

The memory die 305 may also include a microprocessor 320. In some examples, the microprocessor 320 may include or be an example of a central processing unit (CPU). The microprocessor 320 may be configured to execute instructions. Executable instructions for the microprocessor 320 may be referred to as operating code for the microprocessor 320. The microprocessor 320 may execute such instructions, for instance, to monitor and manage (control) various operational aspects of the memory array 310 or other aspects of the memory die 305. In some cases, the microprocessor may be coupled with pads 335 and configured to exchange signals with a device external to the memory die 305 (e.g., a host device 105) via pads 335. Additionally or alternatively, the microprocessor may be coupled with the controller 315 as shown in the example of FIG. 3. And in some cases, the microprocessor 320 may be directly coupled with the memory array 310. For example, one or more structures or functions ascribed herein to the controller 315 may instead be include in or performed by the microprocessor 320, and in some cases a memory die 305 may lack a controller 315. Though one microprocessor 320 is shown in the example of FIG. 3, it is to be understood that in some cases a memory die 305 may include multiple microprocessors 320 (e.g., one on-die microprocessor 320 per bank of a memory array 310, or one on-die microprocessor 320 per memory array 310 with the memory die 305 including multiple memory arrays 310).

Including a microprocessor 320 in the memory die 305 may support a wide variety of functions, as may be appreciated by one of ordinary skill in the art. For instance, a microprocessor 320 may be configured to prevent or fix errors in the memory array 310 related to row hammering. Row hammering may refer to the frequency and repeated activation of one or more same word lines (and thus rows of memory cells). For some types of memory (e.g., FeRAM), if a row is accessed repeatedly within a time interval (e.g., a row is hammered), leakage, parasitic currents, or charge pumping caused by the repeated access to one or more rows may cause data corruption in the one or more victim (activated, accessed) rows as well as one or more non-accessed physically proximate (e.g., adjacent) rows. An on-die microprocessor 320 may be configured to detect row hammer events (e.g., access of a same row above a threshold quantity of times within a threshold duration of time) and to mitigate or prevent the impact of row hammer events (e.g., by physically relocating data associated with a hammered row, adjusting a logical-to-physical address mapping associated with the hammered row or the user data stored at the hammered row, blocking access to the hammered row or the memory array 310 via the bus 340 for at least some duration of time, or any combination thereof).

Additionally or alternatively, the microprocessor 320 may be configured to manage or otherwise support the performance of wear leveling procedures for the memory array 310. Wear-leveling may include, for example, transferring data from one physical location to another physical location within the memory array 310 (or across or between memory arrays 310, such as if a memory die 305 includes multiple memory arrays 310) and adjusting a logical-to-physical address mapping associated with the relocated data (e.g., to correlate an associated logical address with a new physical address corresponding to the new physical location to which the data is relocated). Wear leveling may prevent memory cells within a memory array 310 from being written or read more (e.g., significantly more) than other memory cells within the memory array 310, and thus to reduce a difference between a first extent of wear for a first set of memory cells and a second extent of wear for a second set of memory cells. Excessive accesses may decrease the lifetime of an overused memory cell compared to a memory cell that is not accessed as often, and thus wear leveling may protect a memory device against overuse of individual memory cells that may otherwise cause the memory cells to prematurely fail.

Additionally or alternatively, the microprocessor 320 may be configured to perform in-field device trim optimization. A trim parameter may refer to a parameter (e.g., a timing, voltage, current, or other parameter) for operating the memory array 310 that is configurable after the memory die 305 has been fabricated. In some cases, trim parameters may be set based on blowing one-time programmable storage elements (e.g., fuses or anti-fuses) after the memory die 305 has been fabricated, such as during a post-fabrication test phase or otherwise prior to use (deployment) of the memory die 305. An on-die microprocessor 320, however, may be configured to monitor one or more metrics (characteristics) of array operation (e.g., data error rates or other in-field failure conditions, operating temperature, operating voltages, or the like) and adjust (modify, change) one or more trim parameters based on the monitored metrics, including while the memory die 305 and memory array 310 are operating or otherwise after the memory die 305 and memory array 310 have been deployed. For instance, if a temperature associated with the memory die 305 changes, the microprocessor 320 may modify a value of a parameter (e.g., a voltage or timing parameter) for operating the memory array 310 based on the temperature. As other examples, the microprocessor 320 may be configured to detect and counteract (e.g., through trim parameter adjustment) magnetic field burn-in, affinity, imprint, wear-out, or other conditions adverse to the performance (operation) of the memory array 310. The microprocessor 320 may initiate and manage evaluation (testing procedures) related to detecting such conditions. In some cases, the microprocessor may adjust a trim parameter by adjusting a value stored to a mode register or other reprogrammable storage location on the memory die 305, including in some cases a location with the memory array 310. Additionally or alternatively, the microprocessor may be used to perform built-in self-test (BIST) procedures at manufacturing time to similarly identify and repair (e.g., correct) any quantity of issues.

Operating code for the microprocessor 320 may be stored in the memory array 310, along with user data (received and associated with commands from a device external the memory die 305, such as data received via bus 340). The operating code may include BIOS instructions, a boot address, a full boot sequence, or any other type of instructions executable by the microprocessor 320. The microprocessor 320 may retrieve (e.g., read) the operating instructions from the memory array 310 (e.g., as part of a boot procedure for the microprocessor 320) and execute the operating code to perform any of the functions ascribed herein to the microprocessor 320. The operating code may be stored to physical locations within the memory array 310 that are outside of a logical address space for user data (e.g., associated with the bus 340), at least under a currently operative logical-to-physical address mapping. For example, the operating code for the microprocessor 320 may be stored within one or more skip rows associated with wear leveling procedures for the memory array 310.

In some cases, multiple copies of the operating code for the microprocessor 320, or multiple copies of one or more subsets of the operating code, may be stored in the memory array 310. Additionally or alternatively, multiple copies of the operating code for the microprocessor 320, or multiple copies of one or more subsets of the operating code, may be stored in different respective memory arrays 310 on a memory die 305. Storing multiple copies of some or all of the operating code for the microprocessor 320 may provide redundancy or other reliability benefits, as may be appreciated by one of ordinary skill in the art.

In some cases, operating code for the microprocessor 320 may be protected using an error correcting or detecting code (which may broadly be referred to as an error correcting code (ECC)). For example, the operating code may be stored in a memory array 310 in association with a cyclic redundancy check (CRC) or other type of ECC, which may be used to validate the operating code when the operating code is retrieved from the memory array 310. Such techniques may provide redundancy or other reliability benefits, as may be appreciated by one of ordinary skill in the art.

In some cases, the memory die 305 may also store other data associated with (e.g., read, written, generated, or used by) the microprocessor 320 in the memory array 310. For instance, the memory die 305 may store data (e.g., performance statistics, parameter values, run-time data) collected or computed by the microprocessor 320 in the memory array 310. Such data may, for instance, be used by the microprocessor 320 for performance tracking, parameter adjustment (optimization), or any other function ascribed herein to the microprocessor 320. The other data may also be stored within the memory array 310 in like fashion as the operating code for the microprocessor 320.

Storing operating code and/or other data for the microprocessor 320 in the memory array 310 may have one or more advantages. For example, the memory die 305 need not include any ROM to support the microprocessor 320 (e.g., to store operating code), which may allow the memory die 305 to include the on-die microprocessor 320 while saving die size or space relative to an implementation with a separate ROM. Additionally, as the memory array 310 may have a larger amount of memory than a ROM, a relatively larger program (greater quantity of instructions) may be stored within the memory array 310 relative to an implementation with a separate ROM. Additionally, unlike a ROM, the microprocessor 320 may be able to update and write new data to the memory array 310. One of ordinary skill in the art may appreciate additional benefits.

Because the memory array 310 and the microprocessor 320 are both fabricated to be included in the same memory die 305, one or more fabrication processes (e.g., steps) or structures may be common to the memory array 310 and the microprocessor 320, which may provide manufacturing efficiencies, performance benefits, or any combination thereof. For example, one or more metal layers may be fabricated and processed (e.g., patterned) concurrently to perform electrodes at the same layer of the memory die 305 within both the memory array 310 and the microprocessor 320.

Figure 4:
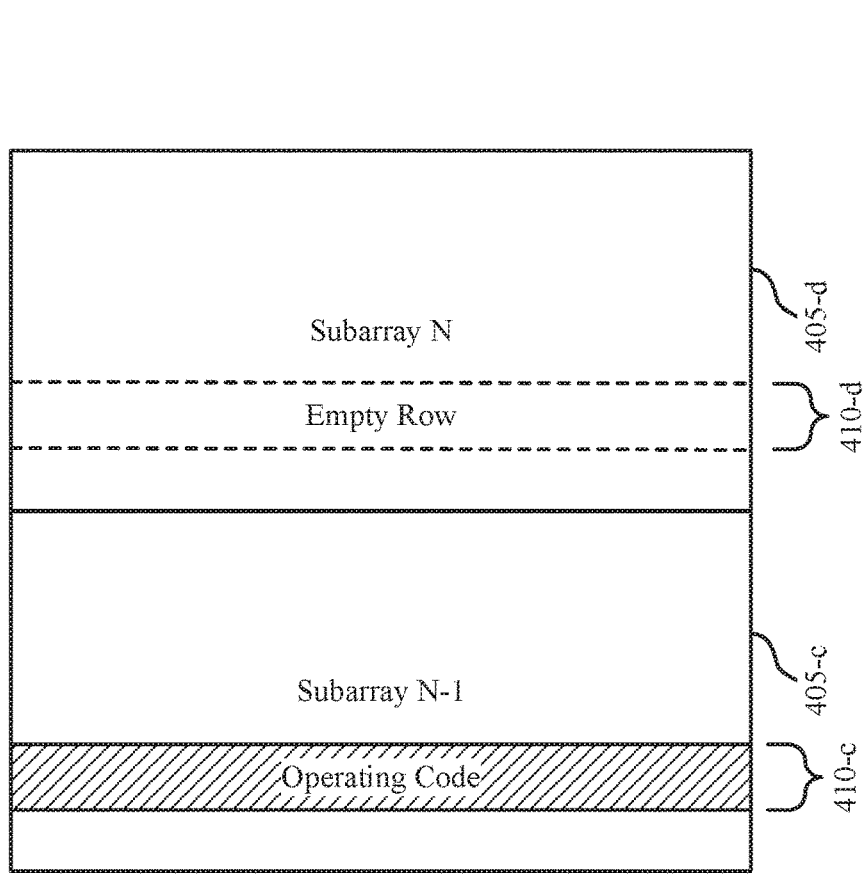
FIG. 4 illustrates an example of an instruction storage scheme that supports operational code storage for an on-die microprocessor in accordance with examples as disclosed herein.
Figure 4:
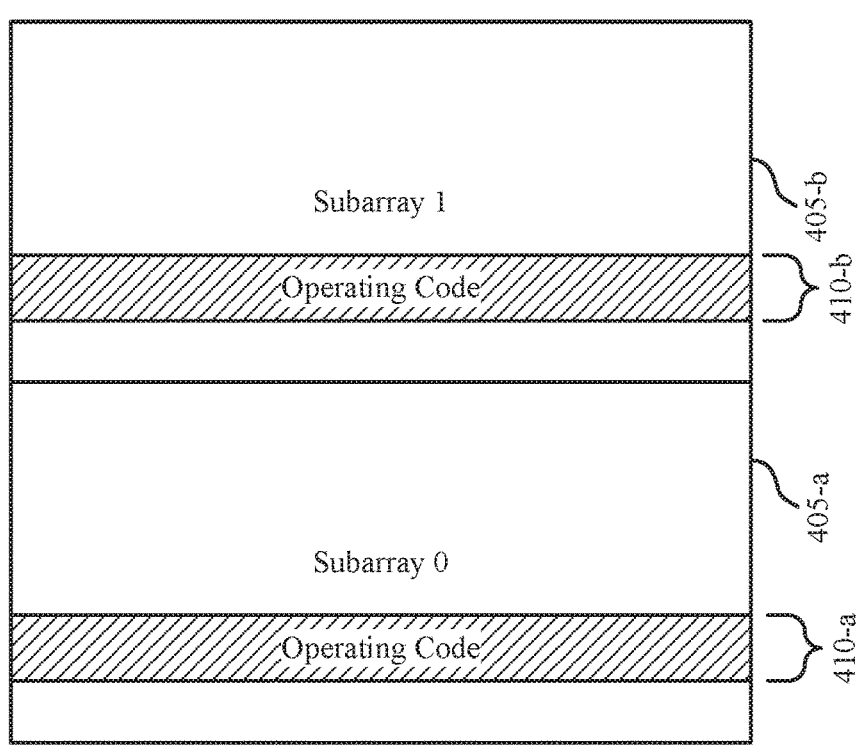

FIG. 4 illustrates an example of an instruction storage scheme 400 that supports operational code storage for an on-die microprocessor in accordance with examples as disclosed herein.

Instruction storage scheme 400 may be implemented at least in part using a set of subarrays 405, which may be subarrays of a memory array 310 as described with reference to FIG. 3 or other memory array as described herein. The subarrays 405 illustrated in the example of FIG. 4 may each be included in a same bank of a memory array 310, but it is to be understood that the teachings herein may be implemented using any quantity (e.g., one or more) of subarrays 405 within any quantity of banks, and any quantity of memory arrays 310 within a memory die 305. Each subarray 405 may include a set of rows (e.g., a set of word lines, each corresponding to (coupled with) a row of memory cells), where each row comprises a set of memory cells.

Within each subarray 405, a first quantity of rows may be for storing user data (e.g., at any given time). Memory cells within the first quantity of rows may be included in a first subset of the memory cells within the subarrays 405 (or alternatively, a first subset of the memory cells within memory array 310). Rows (or memory cells) in the first subset may have physical addresses for which a corresponding logical address exists within a logical address space for the memory array 310 and thus may be accessed based on commands received via the bus 340 (e.g., commands received from a host device 105).

Within each subarray 405, a second quantity of rows may be unavailable for storing user data (e.g., at any given time). Memory cells within the second quantity of rows may be included in a second subset of the memory cells within the subarrays 405 (or alternatively, a first subset of the memory cells within memory array 310). Rows (or memory cells) in the second subset may have physical addresses for which no corresponding logical address exists within the logical address space for the memory array 310 and thus may be inaccessible based on commands received via the bus 340 (e.g., commands received from a host device 105). Thus, the physical address space for the memory array 310 may be larger than the logical address space for the memory array 310. Rows in the second subset may, however, be accessible by the microprocessor 320, the controller 315, or other on-die entities, as such on-die entities may be able to directly access memory cells within the memory array 310 based on their physical addresses or may otherwise have access to the full physical address space for the memory array 310.

In some cases, at least some of the rows within the second subset may be used for wear leveling within the memory array 310. Such rows may be referred to as gap rows or skip rows. When user data stored at a first row in the first set is to be relocated as part of a wear leveling procedure, the user data may be transferred to a skip row, and a logical address associated with the user data may be remapped from the physical address of the first row to the physical address of the skip row. In some cases, any information stored at the skip row may be transferred to the first row, and thus may replace the user data previously stored at the first row, or may be transferred to some other row within the memory array to make room for the user data. In accordance with a wear leveling algorithm, the user data may later be relocated and transferred away from the skip row, either back to the first row or to some other row within the memory array 310.

The physical location of information stored in the memory array 310—user data, operating code for the microprocessor 320, or other data for the microprocessor 320—may rotate (cycle) through the memory array 310 or otherwise vary over time in accordance with a wear leveling algorithm, such that more frequently accessed information (and thus more frequency accessed logical addresses) is not always stored at the same physical rows. Wear leveling procedures may be performed on a scheduled (e.g., periodic) or other basis (e.g., in response to an access count associated with one or more rows reaching a threshold). As the physical storage locations of information rotates, a logical-to-physical address mapping may be updated such that logical addresses for user data similarly rotate (e.g., cycle) through the corresponding subset of the physical address space.

Thus, the physical location (and thus physical address) of a skip row within the memory array 310 may be dynamic (may vary over time, during operation of the memory array 310), but any physical row that is not being used to store user data due at least in part to a wear leveling procedure (e.g., due to user data having been relocated away from the physical row, or due to the physical row being reserved for a potential later relocation of user data to the physical row) may be considered a skip row. Accordingly, within the memory array 310, the physical location of operating code and other data for the microprocessor 320 may vary over time as such information is relocated and cycles (rotates) through the memory array 310 in accordance with the wear leveling algorithm and as associated wear leveling procedures are performed.

In the example of FIG. 4, each subarray 405 may include at least one corresponding skip row 410. For instance, subarray 405-*a* may include skip row 410-*a*; subarray 405-*b* may include skip row 410-*b*; subarray 405-*c* may include skip row 410-*c*; and subarray 405-*d* may include skip row 410-*d*. For instance, skip row 410-*a* may store a first portion of the operating code, skip row 410-*b* may store a second portion of the operating code, and skip row 410-*c* may store a third portion of the operating code. The operating code stored in skip rows 410 may be any example of operating code for a microprocessor as described elsewhere herein (e.g., BIOS code or other executable instructions for the microprocessor), and in some cases other data associated with (e.g., generated by, manipulated by, or otherwise used by) a microprocessor may be similarly stored in skip rows 410. In some examples, not all skip rows 410 in all subarrays 405 need be used store the operating code or the other data associated with the microprocessor, and thus one or more skip rows 410 (e.g., skip row 410-*d*) may be empty, at least when a memory die 305 first begins operation.

In some examples, a skip row 410 within a subarray 405 may initially be located at an end of the subarray 405 and thus may have a physical address that is before or after the physical address of one or more redundant rows. Redundant rows may alternatively be referred to as repair elements, and may also be at least initially included in the second subset of rows that are outside the logical address space. The one or more redundant rows may, in turn, be located at one or more corresponding physical memory addresses after or before one or more dummy rows, which may be included at the extreme ends of a subarray 405 to avoid associated manufacturing imperfections from being associated with rows used to store information.

Due to the operating code and/or other data for the microprocessor 320 being stored in skip rows 410, the operating code and/or other data for the microprocessor 320 may not be accessible via external command (e.g., may be hidden to a host device 105). For example, skip rows may be inaccessible to off-die entities, such as a host device 105, at least in part because skip rows may have physical addresses but the data stored therein may have no corresponding logical address. However, the microprocessor 320 or controller 315 may be operable to retrieve the operating code and/or other data from the skip row 410 and to modify the operating code and/or other data. As such, the microprocessor 320 may be able to boot entirely from operating code stored in the memory array 310 and may also have available storage space within the memory array 310 to read and write run-time data that an external user (e.g., a host device 105) may not be able to access.

Though certain aspects of the teachings herein are explained with reference to rows of memory cells, it is to be understood that the teachings herein may be applied based on any grouping of memory cells and are not limited to memory cells physically arranged in rows.

Figure 5:
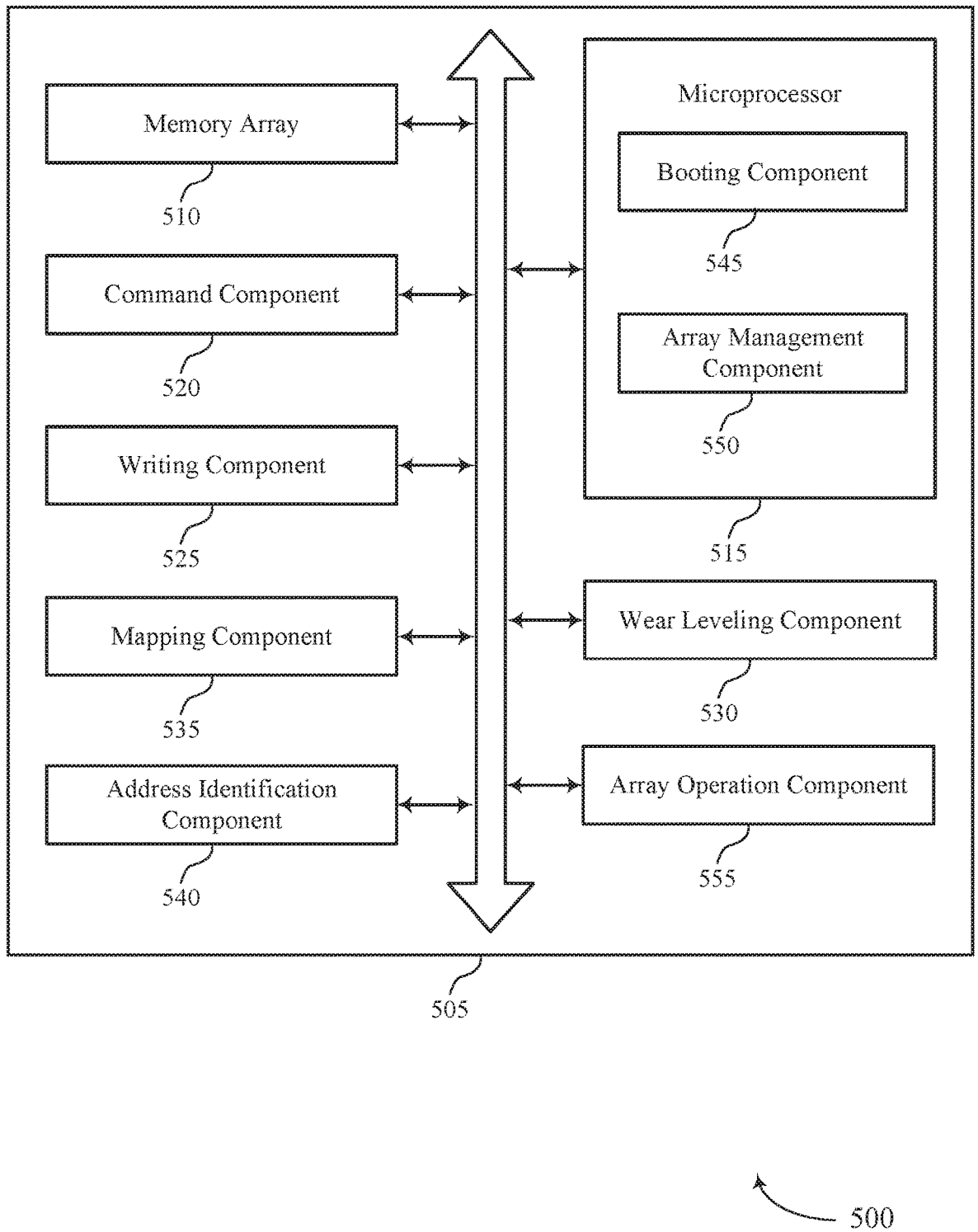
FIG. 5 shows a block diagram of a memory die that supports operational code storage for an on-die microprocessor in accordance with aspects of the present disclosure.

FIG. 5 shows a block diagram 500 of a memory die 505 that supports operational code storage for an on-die microprocessor in accordance with examples as disclosed herein. The memory die 505 may be an example of aspects of a memory die as described with reference to FIGS. 1 through 4. The memory die 505 may include a memory array 510, a microprocessor 515, a command component 520, a writing component 525, a wear leveling component 530, a mapping component 535, an address identification component 540, a booting component 545, an array management component 550, and an array operation component 555. Each of these modules may communicate, directly or indirectly, with one another (e.g., via one or more buses or other signal paths).

The memory array 510 may store instructions for a microprocessor that is included on a same die as the memory array 510. The microprocessor 515 may execute the instructions. In some cases, the booting component 545 may boot the microprocessor based on executing the instructions. In some cases, the instructions include BIOS code for the microprocessor.

The command component 520 may receive, from a source external to the die and after at least some of the instructions are executed (e.g., by the microprocessor 515), a command to write data to the memory array 510. The writing component 525 may write the data to the memory array 510 based on the command.

The wear leveling component 530 may transfer, after the data is written to the memory array 510, the data from a first set of memory cells within the memory array 510 to a second set of memory cells within the memory array 510. In some examples, the memory array 510 may store the instructions using a first set of memory cells after data is transferred from the first set of memory cells. In some cases, the data is transferred based on a procedure configured to reduce a difference between a first extent of wear for the first set of memory cells and a second extent of wear for the second set of memory cells. In some cases, a first subset of memory cells within the memory array 510 is for storing data in response to external commands. In some cases, a second subset of memory cells within the memory array 510 supports the procedure, where the instructions are stored using the second subset of memory cells. In some examples, the wear leveling component 530 may be included in the microprocessor 515 or in a separate controller on the memory die 505.

In some examples, the memory array 510 may include rows of memory cells, the rows associated with respective physical addresses. In some such cases, the mapping component 535 may map, for a first subset of the rows, the respective physical addresses to respective logical addresses of a set of logical addresses, where the instructions are stored to one or more rows of memory cells that are included in a second subset of the rows, the second subset non-overlapping with the first subset.

The address identification component 540 may identify a logical address of the set of logical addresses based on the command. In some examples, the address identification component 540 may identify a physical address based on the logical address and the mapping, where at least a portion of the data is written to a row of memory cells included in the first subset and associated with the physical address.

The array management component 550 may determine a statistic associated with operating the memory array 510. The array management component 550 may be a component of a microprocessor. As such, the determining may be performed by the microprocessor. In some examples, the writing component 525 may write an indication of the statistic associated with operating the memory array to the memory array 510.

In some examples, the array management component 550 may determine a value of a parameter for operating the memory array 510. In some examples, the writing component 525 may write an indication of a value of a parameter for operating the memory array to the memory array. The array operation component 555 may operate the memory array according to the value of the parameter determined by the operation determination component 550. In some examples, the array operation component 555 may be included in the microprocessor 515 or in a separate controller on the memory die 505.

Figure 6:
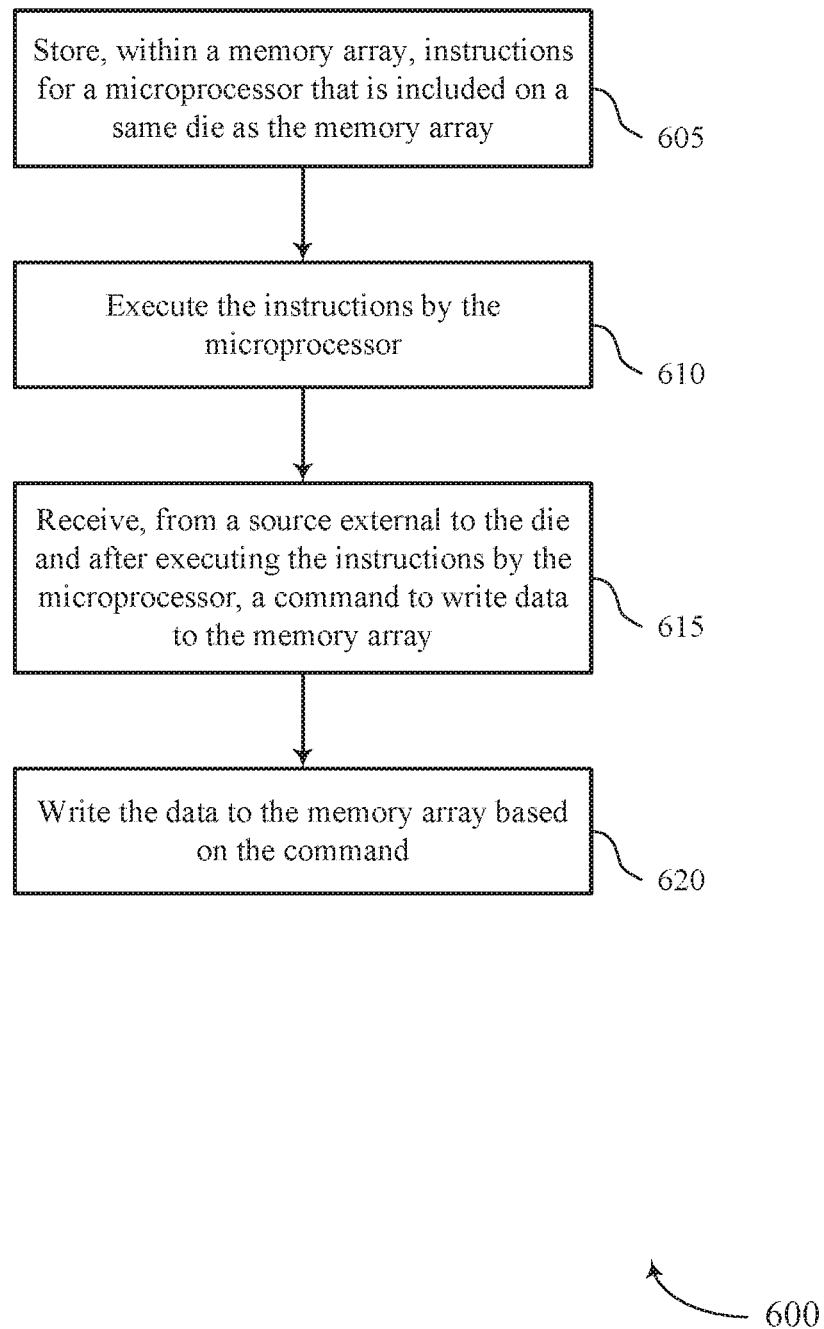
FIGS. 6 and 7 show flowcharts illustrating a method or methods that support operational code storage for an on-die microprocessor in accordance with examples as disclosed herein.

FIG. 6 shows a flowchart illustrating a method or methods 600 that supports operational code storage for an on-die microprocessor in accordance with aspects of the present disclosure. The operations of method 600 may be implemented by a memory die or its components as described herein. For example, the operations of method 600 may be performed by a memory die as described with reference to FIG. 5. In some examples, a memory die may execute a set of instructions to control the functional elements of the memory die to perform the described functions. Additionally or alternatively, a memory die may perform aspects of the described functions using special-purpose hardware.

At 605, the memory die may store, within a memory array, instructions for a microprocessor that is included on a same die as the memory array. The operations of 605 may be performed according to the methods described herein. In some examples, aspects of the operations of 605 may be performed by a memory array as described with reference to FIG. 5.

At 610, the memory die may execute the instructions by the microprocessor. The operations of 610 may be performed according to the methods described herein. In some examples, aspects of the operations of 610 may be performed by a microprocessor as described with reference to FIG. 5.

At 615, the memory die may receive, from a source external to the die and after executing the instructions by the microprocessor, a command to write data to the memory array. The operations of 615 may be performed according to the methods described herein. In some examples, aspects of the operations of 615 may be performed by a command component as described with reference to FIG. 5.

At 620, the memory die may write the data to the memory array based on the command. The operations of 620 may be performed according to the methods described herein. In some examples, aspects of the operations of 620 may be performed by a writing component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for storing, within a memory array, instructions for a microprocessor that is included on a same die as the memory array, executing the instructions by the microprocessor, receiving, from a source external to the die and after executing the instructions by the microprocessor, a command to write data to the memory array, and writing the data to the memory array based on the command.

Some examples of the method 600 and the apparatus described herein may further include operations, features, means, or instructions for transferring, after writing the data to the memory array, the data from a first set of memory cells within the memory array to a second set of memory cells within the memory array, and storing the instructions using the first set of memory cells after the data may be transferred.

In some examples of the method 600 and the apparatus described herein, the data may be transferred based on a procedure configured to reduce a difference between a first extent of wear for the first set of memory cells and a second extent of wear for the second set of memory cells.

In some examples of the method 600 and the apparatus described herein, a first subset of memory cells within the memory array may be for storing data in response to external commands, and a second subset of memory cells within the memory array supports the procedure, where the instructions may be stored using the second subset of memory cells.

In some examples of the method 600 and the apparatus described herein, the memory array may include rows of memory cells, the rows associated with respective physical addresses. Additionally, the memory array may include operations, features, means, or instructions for mapping, for a first subset of the rows, the respective physical addresses to respective logical addresses of a set of logical addresses, where the instructions may be stored to one or more rows of memory cells that may be included in a second subset of the rows, the second subset non-overlapping with the first subset.

Some examples of the method 600 and the apparatus described herein may further include operations, features, means, or instructions for identifying a logical address of the set based on the command, and identifying a physical address based on the logical address and the mapping, where at least a portion of the data may be written to a row of memory cells included in the first subset and associated with the physical address.

Some examples of the method 600 and the apparatus described herein may further include operations, features, means, or instructions for booting the microprocessor based on executing the instructions.

In some examples of the method 600 and the apparatus described herein, the instructions include BIOS code for the microprocessor.

Some examples of the method 600 and the apparatus described herein may further include operations, features, means, or instructions for determining, by the microprocessor, a statistic associated with operating the memory array, and writing an indication of the statistic to the memory array.

Some examples of the method 600 and the apparatus described herein may further include operations, features, means, or instructions for determining, by the microprocessor, a value of a parameter for operating the memory array, writing an indication of the value of the parameter to the memory array, and operating the memory array according to the value of the parameter.

Figure 7:
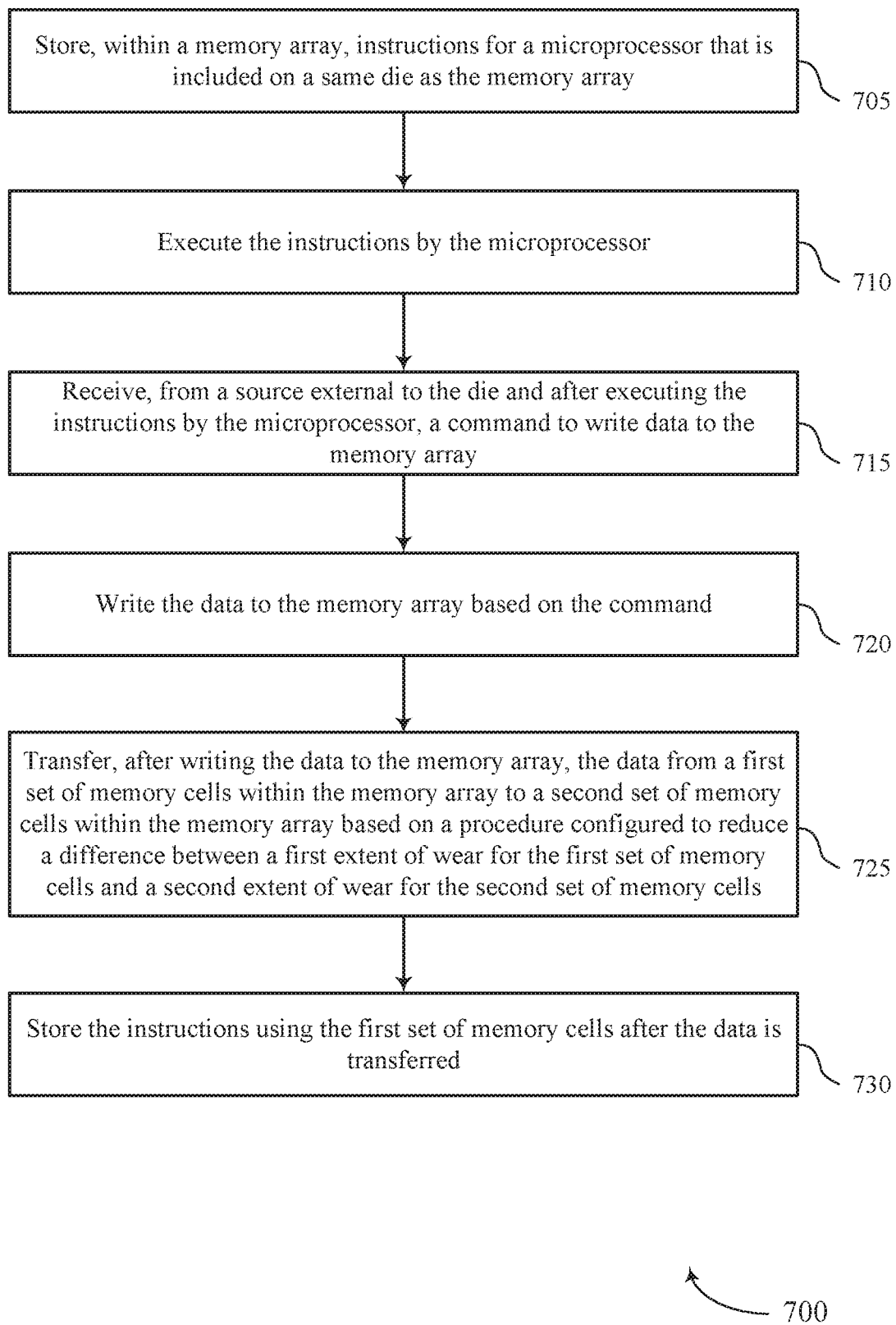

FIG. 7 shows a flowchart illustrating a method or methods 700 that supports operational code storage for an on-die microprocessor in accordance with aspects of the present disclosure. The operations of method 700 may be implemented by a memory die or its components as described herein. For example, the operations of method 700 may be performed by a memory die as described with reference to FIG. 5. In some examples, a memory die may execute a set of instructions to control the functional elements of the memory die to perform the described functions. Additionally or alternatively, a memory die may perform aspects of the described functions using special-purpose hardware.

At 705, the memory die may store, within a memory array, instructions for a microprocessor that is included on a same die as the memory array. The operations of 705 may be performed according to the methods described herein. In some examples, aspects of the operations of 705 may be performed by a memory array as described with reference to FIG. 5.

At 710, the memory die may execute the instructions by the microprocessor. The operations of 710 may be performed according to the methods described herein. In some examples, aspects of the operations of 710 may be performed by a microprocessor as described with reference to FIG. 5.

At 715, the memory die may receive, from a source external to the die and after executing the instructions by the microprocessor, a command to write data to the memory array. The operations of 715 may be performed according to the methods described herein. In some examples, aspects of the operations of 715 may be performed by a command component as described with reference to FIG. 5.

At 720, the memory die may write the data to the memory array based on the command. The operations of 720 may be performed according to the methods described herein. In some examples, aspects of the operations of 720 may be performed by a writing component as described with reference to FIG. 5.

At 725, the memory die may transfer, after writing the data to the memory array, the data from a first set of memory cells within the memory array to a second set of memory cells within the memory array based on a procedure configured to reduce a difference between a first extent of wear for the first set of memory cells and a second extent of wear for the second set of memory cells. The operations of 725 may be performed according to the methods described herein. In some examples, aspects of the operations of 725 may be performed by a wear leveling component as described with reference to FIG. 5.

At 730, the memory die may store the instructions using the first set of memory cells after the data is transferred. The operations of 730 may be performed according to the methods described herein. In some examples, aspects of the operations of 730 may be performed by a memory array as described with reference to FIG. 5.

It should be noted that the methods described herein are possible implementations, and that the operations and the steps may be rearranged or otherwise modified and that other implementations are possible. Further, portions from two or more of the methods may be combined.

An apparatus is described. The apparatus may include a semiconductor die, and the die may include a microprocessor, a memory array coupled with the microprocessor, a bus operable to receive data from a source external to the semiconductor die. The apparatus may further include one or more pins, balls, or bond pads coupled with the bus, and the one or more pins, balls, or bond pads may be couplable with the source external to the semiconductor die. The memory array may be configured to store, within a first subset of memory cells of the memory array, data received via the bus, and the memory array may be configured to store, within a second subset of memory cells of the memory array, instructions executable by the microprocessor.

In some examples, the second subset of memory cells may be configured to support a procedure for leveling wear for memory cells of the memory array.

In some examples, the microprocessor or a controller included on the semiconductor die may be configured to relocate data received via the bus and the instructions within the memory array based on the procedure.

In some examples, the memory array may be associated with a logical address space for data received via the bus, and the second subset of memory cells may be outside the logical address space.

In some examples, the memory array includes a set of rows of memory cells each associated with a respective physical address within a physical address space that may be larger than the logical address space for data received via the bus, and the microprocessor or a controller included on the semiconductor die may be configured to map a subset of the physical address space to the logical address space for data received via the bus, the subset of the physical address space corresponding to the first subset of memory cells.

In some examples, the microprocessor may be configured to retrieve the instructions from the second subset of memory cells and perform a boot procedure based on the instructions.

In some examples, the instructions include BIOS code for the microprocessor.

In some examples, the microprocessor may be configured to compute one or more performance statistics for the memory array and store data associated with the one or more performance statistics within the second subset of memory cells.

In some examples, the microprocessor may be configured to determine a value of a parameter for operating the memory array and write an indication of the parameter to the second subset of memory cells.

In some examples, the memory array includes a set of subarrays that each include at least one row of memory cells within the second subset of memory cells.

An apparatus is described. The apparatus may include a microprocessor included on a die and a memory array included on the die, where the memory array includes a first quantity of rows of memory cells for storing instructions executable by the microprocessor and a second quantity of the rows of memory cells for storing data associated with access commands received by the apparatus.

Some examples of the apparatus may include a wear leveling component configured to relocate the data and the instructions within the memory array.

In some examples, the wear leveling component may be configured to rotate addresses associated with the first quantity of rows to switch a set of rows from being included in the first quantity to being included in the second quantity.

In some examples, the first quantity of rows may be also for storing data associated with the microprocessor.

In some examples, the microprocessor may be configured to boot based on the instructions.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a semiconductor die comprising:
a microprocessor;
a memory array coupled with the microprocessor; and
a bus operable to receive data from a source external to the semiconductor die, wherein:
the memory array is configured to store, within a first subset of memory cells of the memory array, data received via the bus; and
the memory array is configured to store, within a second subset of memory cells of the memory array, instructions executable by the microprocessor, and wherein the memory array is associated with a logical address space for data received via the bus and the second subset of memory cells is outside the logical address space; and
one or more pins, balls, or bond pads coupled with the bus, wherein the one or more pins, balls, or bond pads are couplable with the source external to the semiconductor die.

2. The apparatus of claim 1, wherein the second subset of memory cells is configured to support a procedure for leveling wear for memory cells of the memory array.

3. The apparatus of claim 2, wherein the microprocessor or a controller included on the semiconductor die is configured to:
relocate data received via the bus and the instructions within the memory array based at least in part on the procedure.

4. The apparatus of claim 1, wherein:
the memory array comprises a plurality of rows of memory cells each associated with a respective physical address within a physical address space that is larger than the logical address space for data received via the bus; and
the microprocessor or a controller included on the semiconductor die is configured to map a subset of the physical address space to the logical address space for data received via the bus, the subset of the physical address space corresponding to the first subset of memory cells.

5. The apparatus of claim 1, wherein the microprocessor is configured to:
retrieve the instructions from the second subset of memory cells; and
perform a boot procedure based at least in part on the instructions.

6. The apparatus of claim 1, wherein the instructions comprise Basic Input/Output System (BIOS) code for the microprocessor.

7. The apparatus of claim 1, wherein the microprocessor is configured to:
compute one or more performance statistics for the memory array; and
store data associated with the one or more performance statistics within the second subset of memory cells.

8. The apparatus of claim 1, wherein the microprocessor is configured to:
determine a value of a parameter for operating the memory array; and
write an indication of the parameter to the second subset of memory cells.

9. The apparatus of claim 1, wherein the memory array comprises a plurality of subarrays that each comprise at least one row of memory cells within the second subset of memory cells.

10. A method, comprising:
storing, within a memory array, instructions for a microprocessor that is included on a same die as the memory array, wherein the memory array comprises rows of memory cells, the rows associated with respective physical addresses;
mapping, for a first subset of the rows, the respective physical addresses to respective logical addresses of a set of logical addresses, wherein the instructions are stored to one or more rows of memory cells that are included in a second subset of the rows, the second subset non-overlapping with the first subset;
executing the instructions by the microprocessor;
receiving, from a source external to the die and after executing the instructions by the microprocessor, a command to write data to the memory array; and writing the data to the memory array based at least in part on the command.

11. The method of claim 10, further comprising:
transferring, after writing the data to the memory array, the data from a first set of memory cells within the memory array to a second set of memory cells within the memory array; and
storing the instructions using the first set of memory cells after the data is transferred.

12. The method of claim 11, wherein the data is transferred based at least in part on a procedure configured to reduce a difference between a first extent of wear for the first set of memory cells and a second extent of wear for the second set of memory cells.

13. The method of claim 12, wherein:
a first subset of memory cells within the memory array is for storing data in response to external commands; and
a second subset of memory cells within the memory array supports the procedure, wherein the instructions are stored using the second subset of memory cells.

14. The method of claim 10, further comprising:
identifying a logical address of the set based at least in part on the command; and
identifying a physical address based at least in part on the logical address and the mapping, wherein at least a portion of the data is written to a row of memory cells included in the first subset and associated with the physical address.

15. The method of claim 10, further comprising:
booting the microprocessor based at least in part on executing the instructions.

16. The method of claim 10, wherein the instructions comprise Basic Input/Output System (BIOS) code for the microprocessor.

17. The method of claim 10, further comprising:
determining, by the microprocessor, a statistic associated with operating the memory array; and
writing an indication of the statistic to the memory array.

18. The method of claim 10, further comprising:
determining, by the microprocessor, a value of a parameter for operating the memory array;
writing an indication of the value of the parameter to the memory array; and
operating the memory array according to the value of the parameter.

19. An apparatus, comprising:
a microprocessor included on a die; and
a memory array included on the die, wherein the memory array comprises:
a first quantity of rows of memory cells for storing instructions executable by the microprocessor; and
a second quantity of the rows of memory cells for storing data associated with access commands received by the apparatus, wherein the rows of the first quantity of rows and the second quantity of rows are associated with respective physical addresses, and wherein the apparatus is configured to map the respective physical addresses for the second quantity of rows to respective logical addresses of a set of logical addresses, and wherein the first quantity of rows for storing the instructions is non-overlapping with the second quantity of rows for storing the data.

20. The apparatus of claim 19, further comprising:
a wear leveling component configured to relocate the data and the instructions within the memory array.

21. The apparatus of claim 20, wherein the wear leveling component is configured to rotate addresses associated with the first quantity of rows to switch a set of rows from being included in the first quantity to being included in the second quantity.

22. The apparatus of claim 20, wherein the first quantity of rows are also for storing data associated with the microprocessor.

23. The apparatus of claim 19, wherein the microprocessor is configured to boot based at least in part on the instructions.

* * * * *